US006179344B1

(12) United States Patent
Marsden

(10) Patent No.: US 6,179,344 B1
(45) Date of Patent: Jan. 30, 2001

(54) HOPPER CAR ADAPTER

(75) Inventor: Glynn Charles Marsden, Naperville, IL (US)

(73) Assignee: Shell Oil Company, Houston, TX (US)

( * ) Notice: Under 35 U.S.C. 154(b), the term of this patent shall be extended for 0 days.

(21) Appl. No.: 09/255,760

(22) Filed: Feb. 23, 1999

(51) Int. Cl.[7] ........ F16L 5/00

(52) U.S. Cl. ........ 285/210; 285/364

(58) Field of Search ........ 285/364, 406, 285/363, 368

(56) References Cited

U.S. PATENT DOCUMENTS

| | | | | |
|---|---|---|---|---|
| 2,950,143 | | 8/1960 | Koranda et al. . | |
| 3,020,092 | | 2/1962 | Dorey . | |
| 3,020,093 | | 2/1962 | Dorey . | |
| 3,195,961 | | 7/1965 | Borger et al. . | |
| 4,268,071 | * | 5/1981 | Hanchen et al. | 285/364 |
| 4,867,615 | | 9/1989 | Fritz . | |
| 5,195,851 | | 3/1993 | Shepard et al. . | |
| 5,774,816 | * | 6/1998 | Fontenot et al. | 588/1 |
| 5,878,767 | * | 3/1999 | Etling et al. | 137/15 |

* cited by examiner

*Primary Examiner*—Lynne H. Browne
*Assistant Examiner*—Aaron Dunwoody

(57) ABSTRACT

An adapter for interconnecting a compartment of a railroad hopper car to a product off-loading system provides a positive fluid, mechanical and electrical interface thereby preventing an accidental mechanical disconnect (or loosening) in the off-loading collar of a hopper car, even during the off-loading process. The adapter is all metal and, with flexible metal and embedded metal spiral wire hoses, provides a continuous electrical connection between the hopper car and the storage facility. The adapter also greatly reduces or eliminates the possibility of product blow-by which would create environmental contamination and product loss. The introduction of oxygen into the system is also greatly reduced or eliminated thereby reducing the risk of an explosion or fire. The adapter is made from a single piece of metal, one end of which is adapted to be attached to the standard fixed collar of the outlet fitting of a hopper car. Mechanical and electrical connection of the adapter to the hopper car is made by the use of "dog-ears", which are an integral part of the mating flange which connects to the collar of the standard outlet fitting. The other end of the adapter is fitted with a standard camlock fitting designed to mate with a mating camlock fitting attached to the product and return air hoses which are connected to the storage facility and to a blower system respectively. The blower system provides the fluidization medium for moving the product from the hopper car to the storage facility. The hoses include metal from end to end thereby providing electrical continuity throughout the entire closed-loop system.

2 Claims, 5 Drawing Sheets

HOPPER CAR ADAPTER

BACKGROUND OF THE INVENTION

1. Field of the Invention

The invention is directed to apparatus for aiding in the off-loading of bulk raw materials, particularly solid resins, or materials for making solid resins, from a railroad hopper car.

2. Description of Related Art

It is often necessary to off-load bulk raw materials such as solid resins, materials for making solid resins, wheat, flour, etc., from a railroad hopper car into a receptacle such as a silo or other storage container. This is usually done by connecting a flexible hose to an outlet of the hopper car (which outlet is standard equipment and has been incorporated for that purpose) and emptying the hopper car of its contents. It will be appreciated that for materials which pose a threat for explosion, the hoses/conduits used for off-loading are preferably pressurized by an inert gas, such as dry nitrogen, to ensure that oxygen does not enter the system. For materials which do not pose an explosion problem, ambient air may be used. As shown in FIG. 1, which is a greatly simplified schematic of a typical setup for such a prior art transfer operation, a flexible metal hose 11 is connected to the outlet of a hopper car 10 fitting 20 (shown in more detail in FIGS. 2A and 2B). For simplicity, the return air path and associated hardware are not shown or discussed at this point. The hose 11 is, in turn, connected to the inlet side of a blower 12 either directly or by intermediate tubing 11*a*. It will be appreciated that the blower is usually placed in the "return" air line. The outlet of blower 12 is connected by outlet tubing 11*b* to the top of a silo 14. When it is desired to off-load the cargo from hopper car 10, a valve (not shown) operated by handle 23 at the hopper car 10 outlet fitting 20 (see FIG. 2A) is opened and the blower 12 is energized thereby forcing the gaseous transporting fluid (and cargo) through the tubing 11, 11*a*, 11*b*. The raw material is thus withdrawn from the hopper car 10 through outlet fitting 20, and transported into the silo 14 in a manner which is well known to those skilled in the art.

FIG. 2A shows a typical hopper car 10 outlet fitting generally designated at 20 which is standard equipment on hopper cars. Generally, there are two such fittings located on opposing sides of each compartment of a hopper car 10, one (an inlet 20*a*) for supplying a fluidizing medium such as air/nitrogen, and one (an outlet 20) for removing the raw material from the hopper car 10. For ease of illustration, only the outlet side fitting 20 is described in detail since they are interchangeable. The outlet fitting 20 (shown in more detail in FIG. 2B ) comprises a trough tube 21 which is press-fit into a collar 22 which is, in turn, permanently affixed to the hopper car 10. A handle 23 is readily accessible for opening and closing a valve (not shown) connected thereto and which, in its open position, allows the outflow of material from the hopper car 10 and through the hose 11.

An adapter was required to connect the hose 11 to the outlet fitting 20. A typical prior art adapter previously used by Assignee herein is shown in FIGS. 3A, 3B wherein a rubber slip tube adapter 30 is installed around the trough tube 21 of the hopper car 10 outlet fitting 20. The rubber slip tube adapter 30 may be, e.g., a standard 6¾ inch O.D. ×¼ inch thick rubber tube. The trough tube 21 is used to adapt the steel flexible "product" hose 11 (FIG. 1) to the outlet fitting 20 of the hopper car 10, FIGS. 2A, 2B. The hose 11 is connected to a blower 12 for the purpose of conveying the bulk product into and through a product-conveying loop comprising conduits 11, 11*a*, 11*b* and thence into silo 14 as shown in FIG. 1. The rubber slip tube adapter 30 is secured to the trough tube 21 and hose adapter 19 by tightening the bolts of split clamps 32, 34, thereby compressing and sealing the rubber tube 30 against the trough tube 21 and hose adapter 19. A camlock fitting 31 is provided for mating attachment to hose 11. The trough tube 21, as noted above, is press-fit into the collar 22 (and thereby into hopper outlet fitting 20 itself, as described above) and, due to this press-fit, the slip tube adapter 30 and the trough tube 21 have a tendency to loosen with respect to collar 22 and, in turn, the outlet fitting 20, during the transfer process. The trough tube 21 has been known to completely separate from the hopper outlet 20, thereby causing a breach in the system. This is unsafe, due to the introduction of air into an inerted (such as by dry nitrogen) system which is conveying a dusty powder and because of the exposure of personnel thereto at the time of the release. It also has a negative environmental impact due to the release of product to the environment. Other problems are encountered due to the material of construction, i.e., the slip tube 30 is constructed entirely of a rubber material which is an electrical insulator. This is not desirable because of the need to bond, i.e., to electrically ground the entire system in order to dissipate the electrostatic charge created during the transfer of product, thereby reducing the chance of an explosion. This has heretofore generally necessitated a grounding wire system connecting the hopper car 10 to the downstream transfer system.

The prior art discloses systems which are primarily hopper car 10 product and trough control devices, which would require a complete reconstruction of the hopper car 10 outlet fitting 20 in order to solve the noted problems. In contrast, the hopper car 10 adapter 40, i.e., the invention disclosed herein, can be installed without any modification to the existing design/configuration of hopper cars and addresses issues not identified in existing designs.

SUMMARY OF THE INVENTION

An adapter for interconnecting a compartment of a railroad hopper car to a product off-loading system provides a positive fluid, mechanical and electrical interface thereby preventing an accidental mechanical disconnect (or loosening) in the off-loading collar of a hopper car, even during the off-loading process. The adapter is all metal and, with flexible metal and embedded metal spiral wire hoses, provides a continuous electrical connection between the hopper car and the storage facility. The adapter also greatly reduces or eliminates the possibility of product blow-by which would create environmental contamination and product loss. The introduction of oxygen into the system is also greatly reduced or eliminated thereby reducing the risk of an explosion or fire. The adapter is made from a single piece of metal, one end of which attaches to the standard fixed collar of the outlet fitting of a hopper car. Mechanical and electrical connection of the adapter is made by the use of "dog-ears", which are an integral part of the mating flange which connects to the collar of the standard outlet fitting. The other end of the adapter is fitted with a standard camlock fitting designed to mate with a mating camlock fitting attached to the "product" and "return" air hoses which are connected to the storage facility and to a blower system respectively. The blower system provides the fluidization medium for moving the product from the hopper car to the storage facility. The flexible metal and embedded metal spiral wire hoses include metal from end to end thereby providing electrical continuity throughout the entire closed-loop system.

DESCRIPTION OF THE PREFERRED EMBODIMENTS

Figure 1:
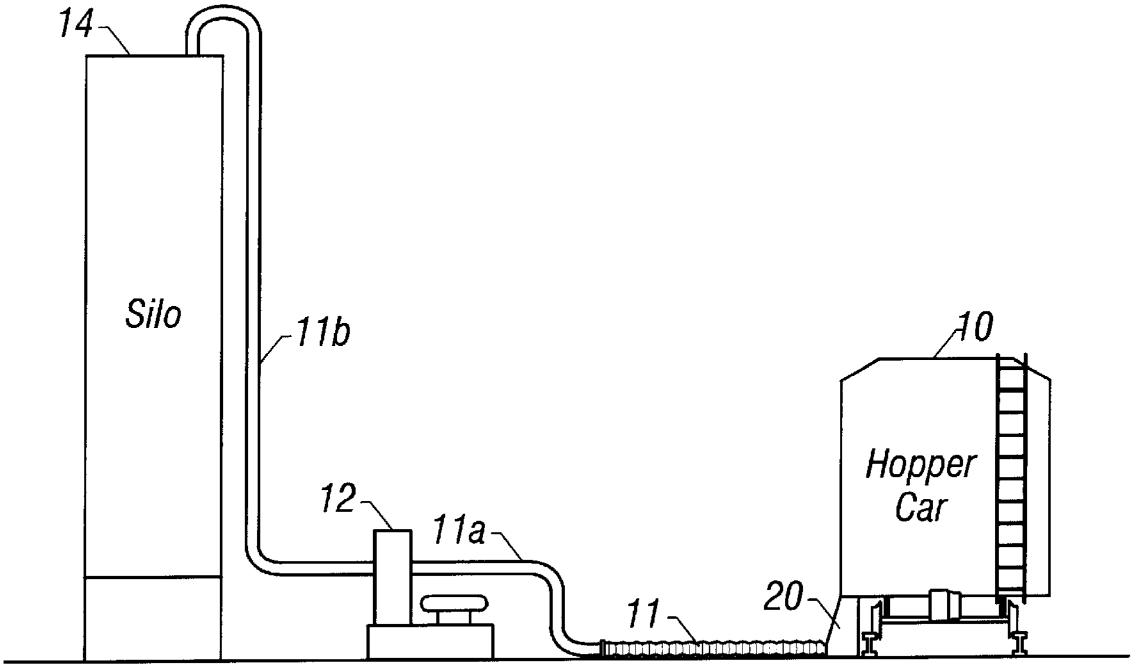
FIG. 1 (Prior Art)
FIG. 1 is a greatly simplified schematic of a typical prior art setup for off-loading dry bulk materials from a railroad hopper car into a silo.
Figure 2A:
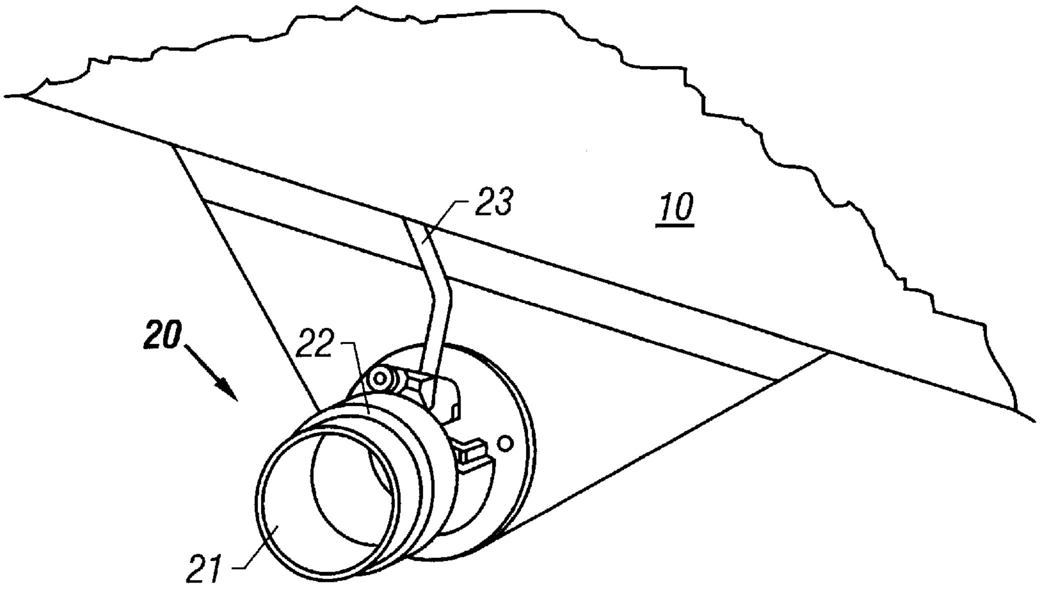
FIG. 2A (Prior Art)
FIG. 2A is an isometric view of a typical outlet fitting of a railroad hopper car.
Figure 2B:
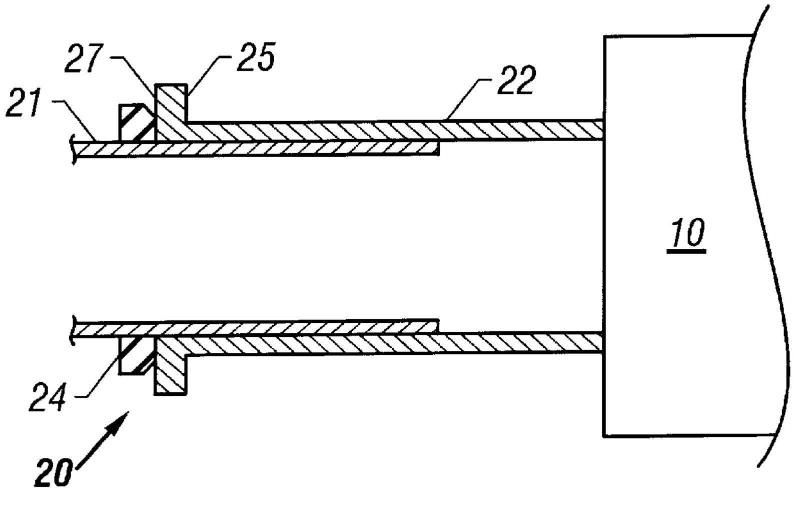
FIG. 2B (Prior Art)
FIG. 2B is a side elevation cross-sectional view of the outlet fitting of FIG. 2A taken on the diameter thereof.
Figure 3A:
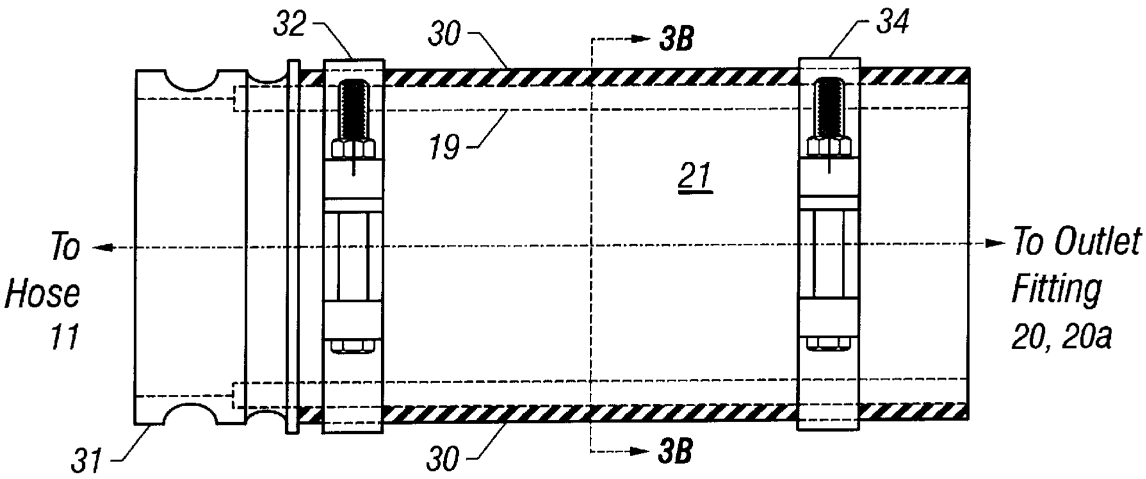
FIG. 3A (Prior Art)
FIG. 3A is a side elevational view of a prior art adapter used by Assignee herein.
Figure 3B:
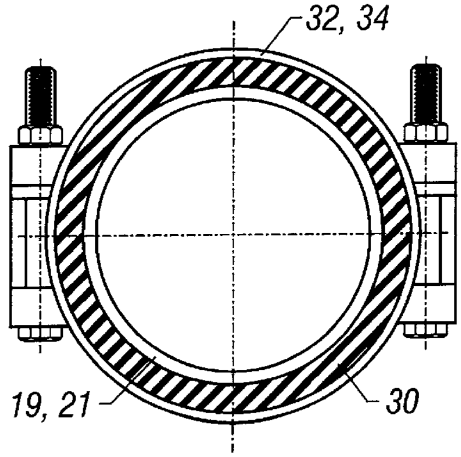
FIG. 3B (Prior Art)
FIG. 3B is an end view of the prior art adapter of FIG. 3A.
Figure 4A:
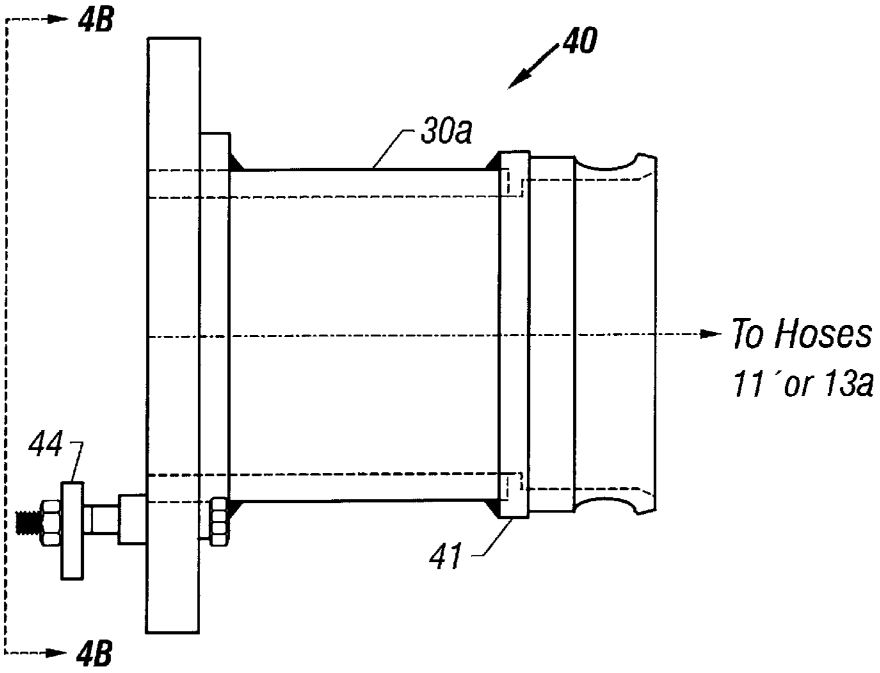
FIG. 4A is a side elevational view of an adapter according to the present invention.
Figure 4B:
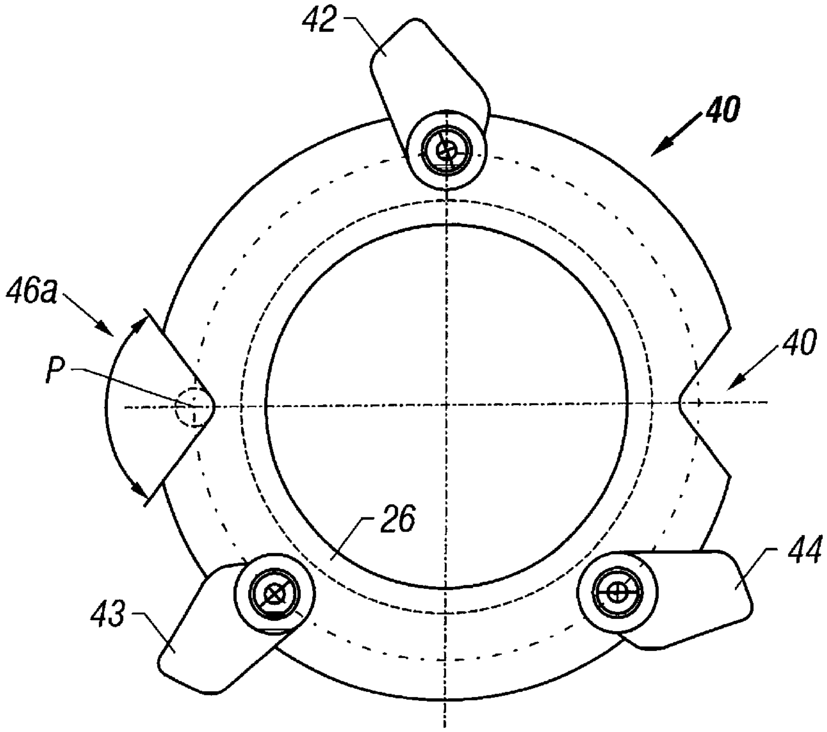
FIG. 4B is a front elevational view taken along the line 4B—4B of FIG. 4A.
Figure 4C:
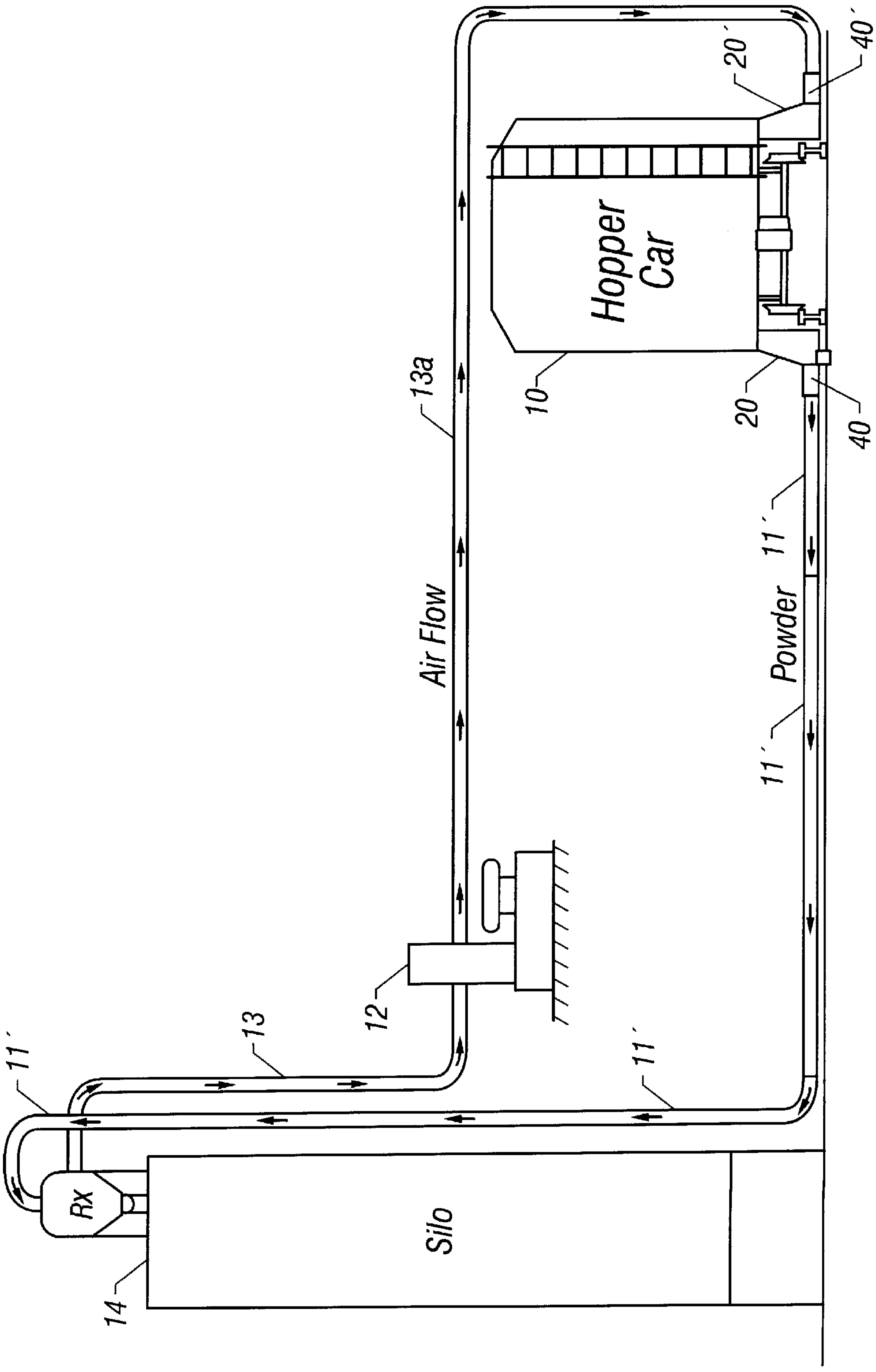
FIG. 4C is a simplified schematic of the transfer system utilizing the adapter of FIGS. 4A and 4B.

Referring now to FIGS. 4A, 4B and 4C, an improved adapter, shown generally at 40, is provided for use in off-loading the contents of a hopper car 10 into a silo 14. The hopper car 10 includes an outlet fitting 20, and an inlet fitting **20*a* on opposing sides of the hopper car 10, as shown and discussed previously herein with reference to FIGS. 2A and 2B. Each fitting 20, 20*a* includes an adapter such as trough tube 21 connected therein in a press-fit manner. Output fitting 20 is connected by a suitable flexible metal hose or conduit 11' which terminates at the input of a receiver RX located at the top of the silo 14 and discharges the raw material thereinto as described above with respect to the conventional adapter 30. As previously noted, the flexible metal hose or conduit 11' is generally pressurized by an inert gas such as dry nitrogen during any off-loading process involving explosive materials. A blower 12, connected to the receiver RX of silo 14 by means of return air duct or conduit 13, supplies the fluidizing air (or other gas) for conveying the raw material. The blower 12 is connected to the input side fitting 20*a* of one compartment of the hopper car 10 by return air duct or conduit 13*a* and a second adapter 40'. This forms a closed-loop system for the air supply. It will be appreciated that, although the conduits 11', 13 and 13*a* are described herein as being flexible, portions thereof may actually be metal tubes, such as aluminum. Upon activating the blower 12 and opening the valves (not shown) by means of the levers 23 on the hopper car 10 outlet 20 and inlet 20*a* fittings, material within the hopper car 10 compartment begins flowing through the hose 11' and falls into the silo 14 by the force of gravity in a well-known manner. Heretofore, the adapter 30 previously described and shown in FIG. 3**, has conventionally been used to effect this transfer with the aforementioned attendant problems.

Without modification to the existing hopper car 10 off-loading fittings 20, **20*a*, the adapter 40, 40' according to the present invention (shown in FIGS. 4A and 4B), can be installed over the trough tube 21 (thereby surrounding and isolating the trough tube 21). Adapter 40 is sealingly secured to the collar 22 of outlet fitting 20 by tightening the bolts on dog ears 42, 43, 44 thereby forcing them against the lip 25 of collar 22 positioned around the trough tube 21 (see FIG. 2B). The trough tube 21, as previously noted, is simply press-fit into the collar 22, while the collar 22 is a fixed part of the outlet fitting 20, i.e., it is fixedly (permanently) fabricated as an immovable part of the fitting 20 which is fixedly secured to the hopper car 10. The collar 22, therefore, provides a more secure fit to the hopper car 10 outlet fitting 20. The face 27 of collar 22 seats against a gasket 24 that is slideably installed on the tube 21 for sealing the trough tube 21/collar 22/adapter 40 interface by means of the gasket-receiving groove 26 in the mating face of adapter 40 which receives the gasket 24 therein. This offers a more positive seal, thus reducing "leak by", which is common in the prior art systems, hence greatly reducing product spillage and waste. Due to its metal construction, the adapter 40 offers a more positive electrical "bond" between the conveying system and the hopper car 10, thus reducing the potential for a static electrical discharge between fittings. It also isolates the trough tube 21 so as to prevent the trough tube 21 from causing a leak even if it becomes separated from the hopper car 10 outlet 20. This allows for a much safer and more reliable operation. The second adapter 40' is connected to inlet fitting 20*a*** in a similar manner.

Referring now to FIGS. 4A and 4B which show details of the improved adapter 40, aluminum tubing **30*a* replaces the rubber tubing 30 of the prior art system thus ensuring rigidity and good electrical bonding. In the mating faceplate of the adapter 40, two notches 46, 46*a* are provided to accommodate movement of the valve handle 23 of hopper car 10 fittings 20, 20*a* for opening and closing a valve (not shown) in the outlet of hopper car 10. The notches 46, 46*a* are cut out of the mating faceplate for about 108° (of the circle formed with the center P about which the handle 23 rotates) to allow a full swing of the handle 23 from a fully closed position to a fully open position. A groove 26 machined into the mating faceplate of adapter 40 receives the gasket 24 which is slideably positioned on trough tube 21/collar 22** to seal this interface and thereby prevent leakage of material and/or fluidizing medium.

The opposite end of adapter 40 terminates in a camlock fitting 41 for receiving a mating camlock fitting on the ends of hoses 11' and **13*a***.

Return air hose 13, **13*a*** may be a flexible duct having an embedded metal wire spiraling from one end to the other.

Conveying hose 11, 11' may be a corrugated metal hose.

The gasket 24 may be made of buna rubber.

Camlock couplings 41 and mating couplings may be purchased from PT coupling company, inc., enid, Okla.

What is claimed is:

1. An adapter for providing fluid, mechanical and electrical connection between a fitting for a railroad hopper car and a product removal system comprising:

a metal conduit, having first and second ends, said first end of said conduit having connection means adapted for fixedly and sealingly connecting said first end to said fitting for a railroad hopper car;

wherein said connection means on said first end of said metal conduit comprises a plurality of dog-ears adapted for rigidly connecting said first end of said metal conduit to said hopper car fitting;

wherein said connection means on said first end of said metal conduit includes gasket-receiving means therein for fluidly sealing said first end when a gasket is received in said gasket-receiving means and when said dog-ears are securely fastened to said railroad hopper car fitting; and wherein said second end of said metal conduit terminates in means adapted for connecting said second end of said metal conduit to a standard camlock fitting.

2. A closed-loop system for off-loading the contents of a railroad hopper car by means of inlet and outlet fittings on said hopper car comprising:

a first metal adapter having a first end connected to said outlet fitting of said hopper car and having a second end connected to a first end of a first conduit, wherein the second end of said first conduit is connected to an input connector of a storage facility;

said storage facility having an output connector connected to the first end of a second conduit and wherein the second end of said second conduit is connected to the input side of a means for providing a fluidizing medium in said conduits; and a third conduit having a first end connected to the output side of said means for providing a fluidizing medium and having a second end connected to a second end of a second metal adapter, the first end of said second metal adapter being connected to said inlet fitting of said railroad hopper car and wherein each of said first and second metal adapters comprises a metal conduit having first and second ends, said first end of said metal conduit having connection means for fixedly connecting said first end to one of said fittings of said railroad hopper car;

wherein said connection means on said first end of said adapter comprises a plurality of dog-ears adapted for rigidly fastening said first end of said adapter to one of said hopper car fittings;

wherein said connection means on said first end of said adapter includes gasket-receiving means therein for fluidly sealing said first end when a gasket is received in said gasket-receiving means and when said dog-ears are securely fastened to said railroad hopper car fitting; and wherein said second end of said metal conduit is terminated in means for connecting said second end to a standard camlock fitting.

* * * * *